Patented Oct. 29, 1940

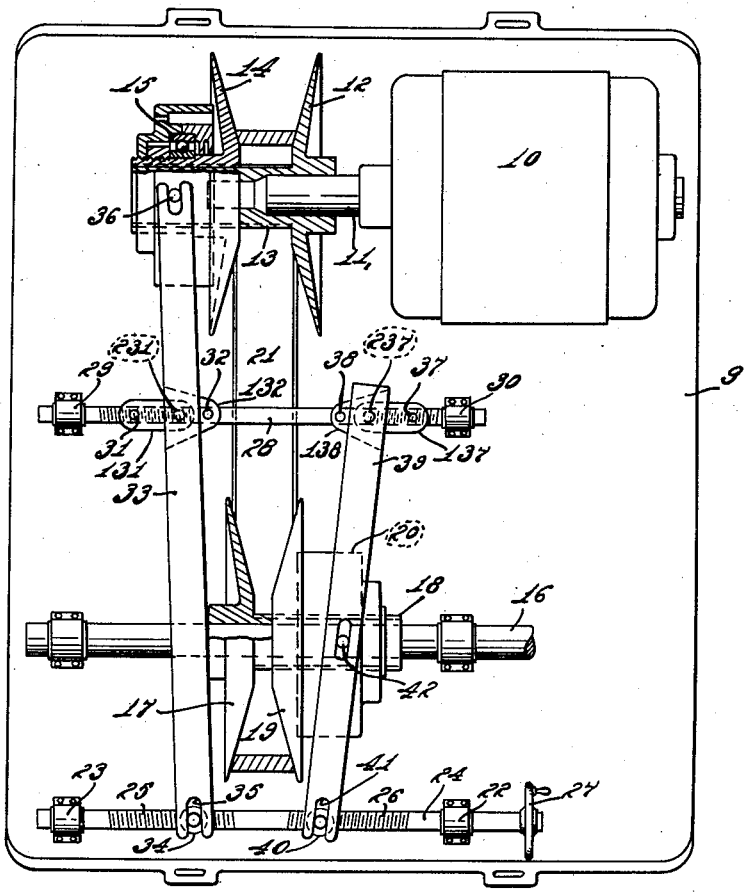

2,219,580

UNITED STATES PATENT OFFICE 2,219,580

VARIABLE RATIO TRANSMISSION

Paul B. Reeves, Columbus, Ind., assignor to Reeves Pulley Company, Columbus, Ind., a corporation of Indiana Application January 8, 1938, Serial No. 183,970

3 Claims. (Cl. 74—230.17)

The present application relates to a variable ratio transmission unit; and more specifically to a composite driving unit of such character as to provide an incrementally variable output speed from a constant speed motor comprising an element of the unit.

The primary object of the invention is to improve and refine details of constructions of the general character of those to which the invention pertains. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

The single figure is a plan view of a unit constructed in accordance with the present invention.

Referring more particularly to the drawing, it will be seen that the unit comprises a base 9 upon which is mounted a motor 10 having spindle 11 to which is fixed a coned disc 12 provided with an axially extending hub 13 projecting from the coned face thereof. A mating disc 14 is axially slidably mounted upon said hub 13; and is formed to support a thrust bearing 15.

Journalled in suitable bearings carried by the base is a driven shaft 16 substantially parallel with the motor spindle 11. A coned disc 17 is fixed to said shaft 16, said disc 17 facing in a direction opposite that in which the disc 12 faces. Said disc 17 is provided with an axially extending hub 18 projecting from the coned face thereof; and a mating coned disc 19 is axially shiftably mounted upon said hub 18, said disc 19 operatively supporting a thrust bearing 20.

It will be apparent that the discs 12 and 14 cooperate to form an expansible V driving pulley, and that the discs 17 and 19 cooperate to form an expansible V driven pulley. A belt 21 provides a driving connection between said pulleys.

Bearings 22 and 23, supported upon the base 9, provide a journalled mounting for a screw shaft 24 which, as is clearly illustrated, is separated from the motor spindle 11 by the driven shaft 16. Adjacent its left-hand end, said screw shaft is formed with right-hand threads 25, while adjacent its right-hand end, said screw shaft is provided with left-hand threads 26. A hand wheel 27 is carried by the screw shaft 24 beyond the bearing 22.

An adjusting shaft 28 is supported in bearings 29 and 30 mounted on the base 9. Said adjusting shaft 28 is positioned between the motor spindle 11 and the driven shaft 16, and lies in a plane parallel to said spindle and to said shaft and perpendicular to the common plane of said spindle and said shaft. Upon a portion of the adjusting shaft 28 which is provided with right-hand threads, there is threadedly mounted a nut carrying a pin 31 with which is pivotally associated one end of a link 131 carrying at its opposite end a pin 231. A bracket 132 is pivotally connected with said pin 231 and is pivotally mounted on a fulcrum 32 carried by a collar slidably mounted on the unthreaded portion of the shaft 29; and a lever 33 is pivotally mounted, intermediate its ends, upon said bracket 132. It will be noted that the fulcrum pins 31 and 32 lie in the plane above defined. A nut 34 is threadedly mounted upon the threaded section 25 of the screw shaft 24, and said nut carries a projection operatively received in a notch 35 in one end of the lever 33. The opposite end of said lever 33 is operatively engaged, as at 36, with the thrust bearing 15.

A second fulcrum pin 37 is carried by a nut threadedly mounted upon a portion of the adjusting shaft 28 which is formed with left-hand threads; and a link 137 is pivotally associated at one end with said pin and carries a pin 237 at its opposite end. A bracket 138 is pivotally connected with said pin 237 and is pivotally mounted on a fulcrum 38 carried by a collar slidably mounted on the unthreaded portion of the shaft 28. It will be noted that the fulcrum pins 37 and 38 likewise lie in said plane above defined, and that they are parallel with the pins 31 and 32. A second lever 39 is pivotally mounted, at one end, upon the bracket 138. A second nut 40 is threadedly mounted upon the threaded portion 26 of the screw shaft 24, and carries a projection operatively received in a notch 41 in the opposite end of the lever 39. At a point intermediate its ends, the lever 39 is operatively engaged, as at 42, with the thrust bearing 20.

It will be obvious that, as the hand wheel 27 is rotated in a counter-clockwise direction as viewed from the right of the figure, the associated end of the lever 39 will be moved to the right to shift the disc 19 to the right to expand the pulley 17, 19; and that, simultaneously, the associated end of the lever 33 will be shifted toward the left to move the disc 14 toward the right to contract the pulley 12, 14.

The shaft 28 may be rotated, if desired, to vary the tension of the belt 21.

It will be seen that the construction herein disclosed is one which may be very readily assembled and disassembled, and which further has the advantage resident in the fact that the motor 10 and the hand wheel 27 are both presented in the same general direction from the unit; so that the unit may be positioned in substantial contact with a wall, or the like, while yet leaving both the motor and the hand wheel accessible.

I claim as my invention:

1. A variable-speed transmission unit comprising a screw shaft, a driving shaft, and a driven shaft journalled in at least two bearings and positioned between said screw shaft and said driving shaft, an expansible driving pulley mounted on said driving shaft and comprising a coned disc fixed to said driving shaft and a mating coned disc axially shiftable with respect thereto and readily removable from said shaft, an expansible driven pulley mounted on said driven shaft between said bearings and comprising a coned disc fixed to said driven shaft and a mating coned disc axially shiftable with respect thereto, an edge-active belt providing a driving connection between said pulleys, a lever pivoted intermediate its ends, one end of said lever being operatively associated with said driving shaft shiftable disc, and the other end of said lever being operatively associated with said screw shaft, and a second lever pivoted adjacent one end, the other end of said second lever being operatively associated with said screw shaft, and said second lever being operatively associated, intermediate its ends, with said driven pulley shiftable disc.

2. A variable speed driving unit comprising a motor having a spindle, an expansible driving pulley mounted on said spindle and comprising a coned disc fixed to said spindle with its coned face presented away from said motor and a mating coned disc axially shiftable with respect thereto, a shaft substantially parallel with said motor spindle, a driven expansible pulley mounted on said shaft and comprising a coned disc fixed to said shaft with its coned face presented oppositely with respect to said driving pulley fixed disc and a mating coned disc axially shiftable with respect thereto, an edge-active belt providing a driving connection between said pulleys, a screw shaft separated from said spindle by said driven shaft, a fulcrum positioned in a plane parallel to said spindle and driven shaft and perpendicular to the common plane thereof and disposed between said spindle and shaft, a lever pivotally mounted, intermediate its ends, on said fulcrum, one end of said lever being operatively associated with said screw shaft and the other end thereof being operatively associated with said driving pulley shiftable disc, a second fulcrum parallel with said first fulcrum and disposed in said plane, and a second lever having one end pivotally mounted on said second fulcrum, the other end of said second lever being operatively associated with said screw shaft and said second lever being operatively associated, intermediate its ends, with said driven pulley shiftable disc.

3. A variable speed driving unit comprising a motor having a spindle, an expansible driving pulley mounted on said spindle and comprising a coned disc fixed to said spindle with its coned face presented away from said motor, said disc being provided with an elongated hub projecting axially from its coned face, and a mating coned disc axially slidably mounted on said hub and readily removable from said hub and spindle, a shaft substantially parallel with said motor spindle and journalled in at least two bearings, a driven expansible pulley mounted on said shaft between said bearings and comprising a coned disc fixed to said shaft with its coned face presented oppositely with respect to said driving pulley fixed disc and a mating coned disc axially shiftable with respect thereto, an edge active belt providing a driving connection between said pulleys, a screw shaft, and two pivoted levers, one of said levers providing an operative connection between said screw shaft and said driving pulley shiftable disc, and the other of said levers providing an operative connection between said screw shaft and said driven pulley shiftable disc.

PAUL B. REEVES.